United States Patent [19]

Harwich

[11] Patent Number: 5,806,458
[45] Date of Patent: Sep. 15, 1998

[54] SECURE FLYING ANIMAL FEEDER

[76] Inventor: Mary Belle T. Harwich, P.O. Box 533, Glencoe, Ill. 60022

[21] Appl. No.: 752,733

[22] Filed: Nov. 19, 1996

[51] Int. Cl.$^6$ ...................................................... A01K 1/10
[52] U.S. Cl. ............................................................ 119/51.03
[58] Field of Search ............................. 119/51.03, 51.04, 119/52.2, 52.3, 52.4, 54, 57.8, 57.9, 58, 59

[56] References Cited

U.S. PATENT DOCUMENTS

| | | |
|---|---|---|
| D. 85,404 | 10/1931 | Townley . |
| D. 330,953 | 11/1992 | Schneider . |
| 988,599 | 4/1911 | Shaw ..................................... 119/51.03 |
| 1,092,314 | 4/1914 | White ..................................... 119/51.03 |
| 1,221,019 | 4/1917 | Bowdish ............................... 119/51.03 |
| 1,592,493 | 7/1926 | Kelly . |
| 2,504,282 | 4/1950 | Tobias ................................... 119/51.03 |
| 3,273,537 | 9/1966 | Orr ........................................ 119/51.03 |
| 3,399,650 | 9/1968 | Goodman .............................. 119/51.03 |
| 3,927,645 | 12/1975 | Varner . |
| 3,948,220 | 4/1976 | Fiedler . |
| 4,747,371 | 5/1988 | Leopold . |
| 4,807,569 | 2/1989 | Leopold . |
| 4,926,796 | 5/1990 | Leopold . |
| 5,052,342 | 10/1991 | Schneider . |
| 5,076,214 | 12/1991 | Petit . |
| 5,189,985 | 3/1993 | Brady et al. ......................... 119/51.03 |

OTHER PUBLICATIONS

Duncraft catalog, pp. 37–40, 1995.

*Primary Examiner*—Thomas Price
*Attorney, Agent, or Firm*—Lockwood, Alex, FitzGibbon & Cummings

[57] ABSTRACT

A flying animal or bird feeder is described. The feeder includes first and second faces, each face having a raised periphery. The raised periphery preferably includes sleeves that wrap around peripheral rods. A hinge member permits the feeder to be placed in both an open and a closed orientation. In its open orientation, a source of food, such as suet, may be put on one of the faces. The feeder may then be placed in its closed orientation so that the source of food is compressed between the faces in a sandwich-like fashion. Access to the food can be gained by flying birds, insects and the like through apertures in one or both of the faces. In one embodiment, the raised periphery of the first face engages the raised periphery of the second face when the feeder is in its closed orientation. These raised peripheries prevent consumption of the source of food by non-flying animals, such as squirrels, raccoons and the like.

23 Claims, 2 Drawing Sheets

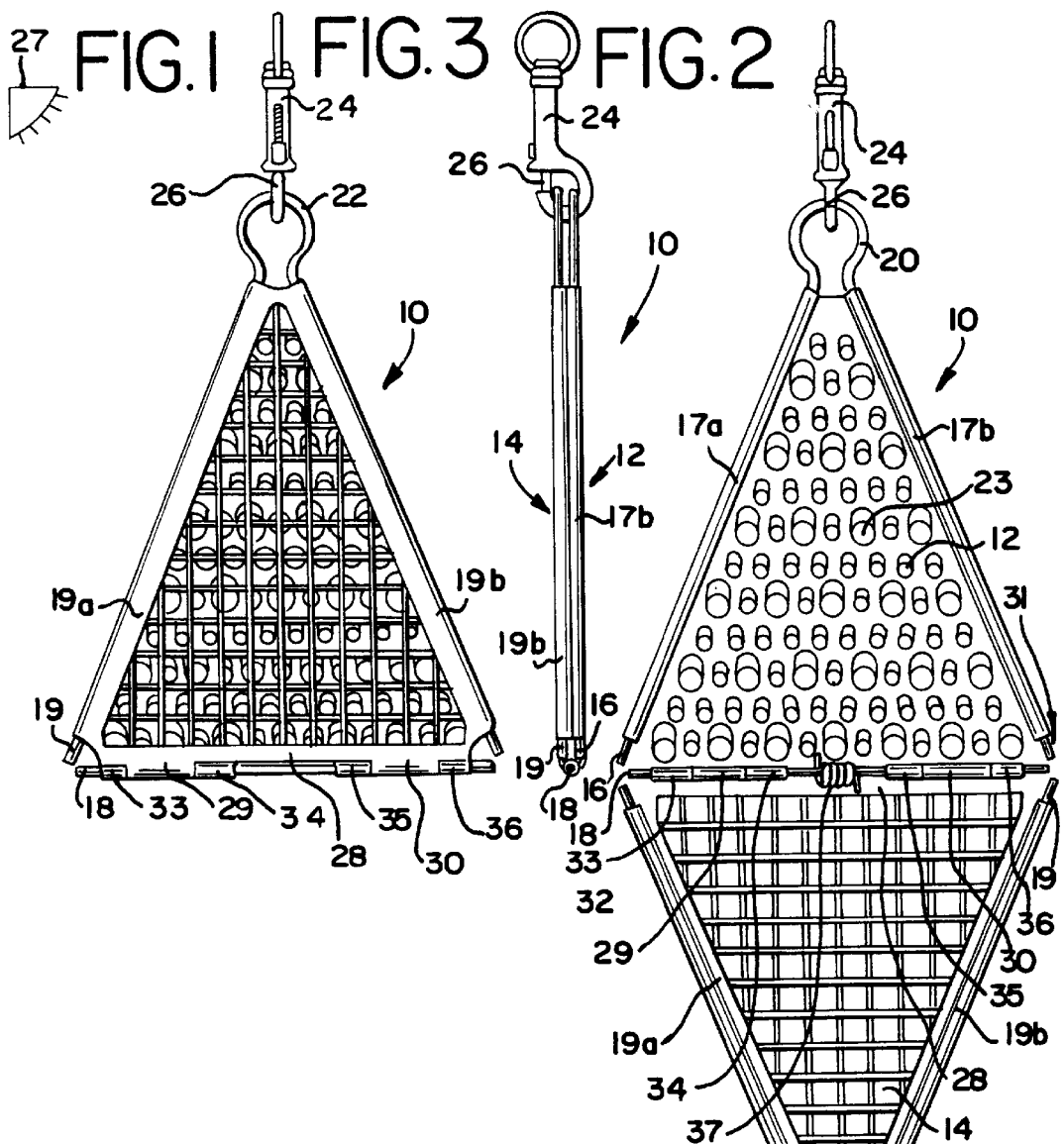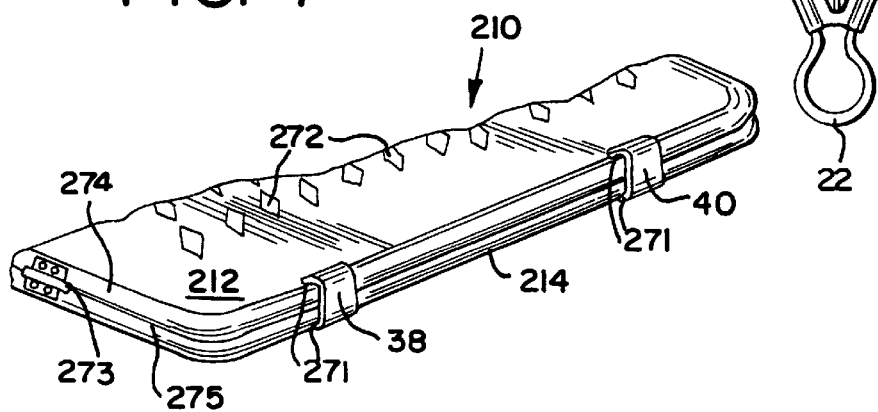

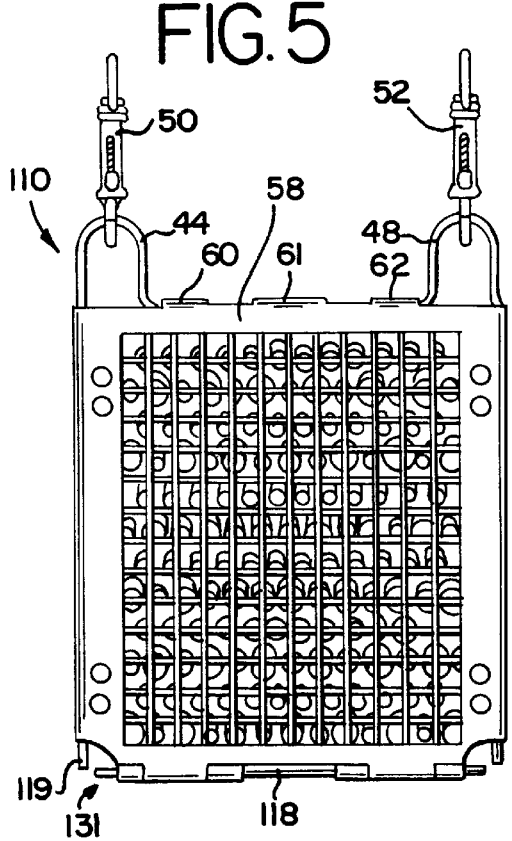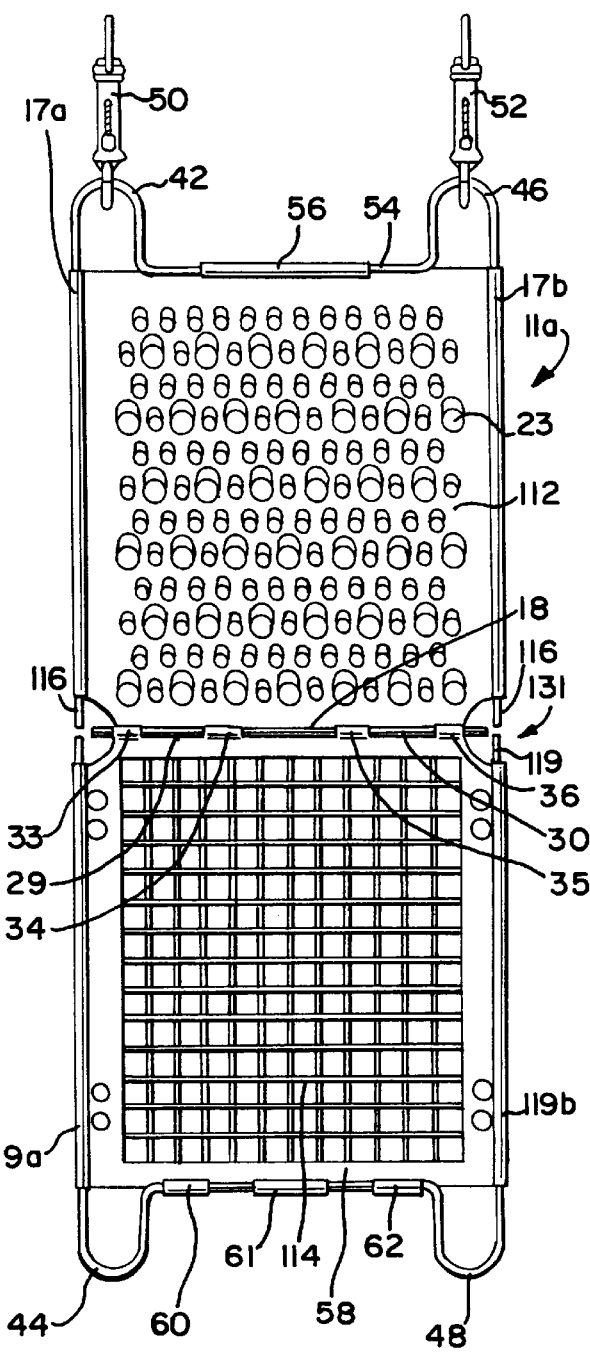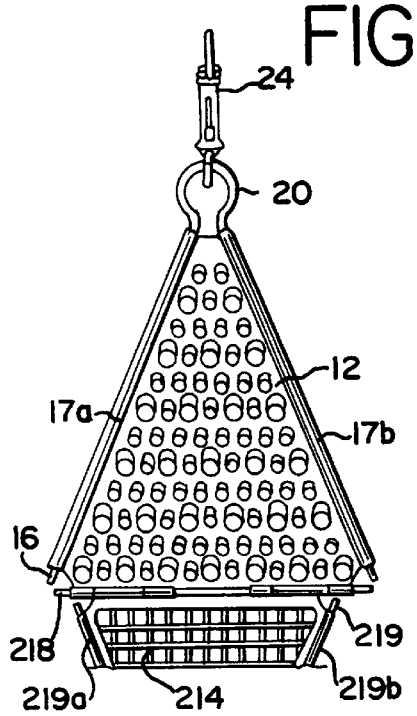

SECURE FLYING ANIMAL FEEDER

BACKGROUND OF THE INVENTION

The present invention relates generally to a feeding apparatus for flying animals such as birds, butterflies, moths and the like. More particularly, the invention relates to a new and improved feeder for flying animals which includes two faces having sleeves extending therefrom that wrap around to provide a raised periphery of the face structures. The edges of the feeder avoid spaces which could permit larger animals, such as squirrels, raccoons and the like, to consume the suet or other food source which had been compressed and secured between the faces of the feeder.

Previously proposed art devices, although useful for limited applications, do not achieve the benefits and advantages derived from the structure and functions of the present invention. The related art suet feeders do not adequately prevent non-flying animals from consuming the source of food contained within the feeder.

An example of a related art device that does not achieve the significant advantages of the present invention is U.S. Pat. No. 1,592,493 issued to L. P. Kelly on Jul. 13, 1926. The device disclosed in the Kelly '493 patent does not prevent the consumption of the food source contained within the feeder by non-flying animals. The Kelly '493 patent discloses a bird feeder device having two cage-like structures that contract as the bulk of fat or suet contained within the feeder is reduced. A weight member, shown as a slab of wood, pulls two links that are in operative association with the cage-like structures to close the structures together as suet is removed from the feeder.

In order to overcome the deficiencies of the related art devices, it is an object of the present invention to provide a new and improved flying animal feeder which is constructed in a manner to allow flying animals such as birds and the like to consume the suet or other food source contained and pressed within the feeder while simultaneously impeding the consumption of the food or suet by larger, non-flying animals.

It is another object of the present invention to provide an improved secure flying animal feeder which permits flying animals to consume the food source from either face of the feeder.

It is a further object of the invention to provide an improved secure flying animal feeder which permits smaller flying animals such as butterflies, moths and the like to consume the food source contained and pressed within the feeder.

It is still another object of the present invention to provide an improved secure flying animal feeder which may be suspended above the ground in a hanged arrangement.

It is a further object of the invention to provide an improved secure flying animal feeder which is structurally designed so that it may be manufactured in a variety of shapes, thereby allowing it to aesthetically conform to a particular outdoor environment.

It is still another object of the invention to provide an improved secure flying animal feeder which is slender so that snow and the like will not gather on top of the feeder.

It is yet another object of the present invention to provide an improved secure flying animal feeder which is constructed so that the suet or other food material is minimally visible when the feeder is in its closed orientation, thereby allowing the feeder to be aesthetically pleasing in an outdoor environment.

SUMMARY OF THE INVENTION

The present invention is directed to a flying animal or bird feeder that includes first and second faces, each face having a raised periphery. First and second faces respectively include sleeves which form a raised periphery for each face. In one illustrated embodiment, the sleeves wrap around a peripheral rod structure. The feeder has an open orientation wherein a source of food, such as suet, for example, may be placed on one of the faces. The feeder also has a closed orientation wherein the source of food is compressed between the faces in a sandwich-like fashion. The raised periphery of the first face engages or is closely spaced from the raised periphery of the second face when the feeder is in its closed orientation. This prevents consumption of the source of food by non-flying animals, such as squirrels, raccoons and the like.

In one embodiment of the present invention, the respective raised peripheries of both faces may engage each other in an in-line abutting manner. In particular, the respective raised peripheries may engage each other along their respective longitudinal lengths.

In another embodiment, the respective raised peripheries of both faces are oriented with respect to each other in an overlapping manner. In this embodiment, the faces, although having a similar shape, will not be the same size. Nevertheless, in either embodiment, large, non-flying animals are prevented from consuming the source of food contained between the faces when the feeder is in its closed orientation.

BRIEF DESCRIPTION OF THE DRAWINGS

The features of the present invention which are believed to be novel are set forth with particularity in the appended claims. The invention, together with the further objects and advantages thereof, may best be understood by reference to the following detailed description taken in conjunction with the accompanying drawings, in the several figures of which like reference numerals identify like elements, and in which:

FIG. 1 is a front elevational view of the improved secure flying animal feeder in accordance with an embodiment of the invention shown in its closed or feeding orientation;

FIG. 2 is a front elevational view of the improved flying animal feeder of FIG. 1 shown in its open orientation;

FIG. 3 is a side elevational view of the improved flying animal feeder of FIGS. 1 and 2 shown in its closed, suet pressing, or feeding orientation;

FIG. 4 is a partial perspective view of another embodiment of the improved flying animal feeder of the present invention;

FIG. 5 is a front elevational view of the improved secure flying animal feeder in accordance with another embodiment of the invention shown in its closed, suet pressing, or feeding orientation;

FIG. 6 is a front elevational view of the flying animal feeder of FIG. 5 shown in its open orientation; and FIG. 7 is a front elevational view of an alternative embodiment closely resembling the flying animal feeder of FIGS. 1–3 shown in its open orientation.

DETAILED DESCRIPTION OF THE PREFERRED EMBODIMENTS

In general, the first illustrated embodiment of the secure feeder has opposing faces with sleeves which wrap around peripheral rods of the face structures. The faces each have additional sleeves. These additional sleeves include tabs extending therefrom that wrap around a hinge rod. The hinge rod is included within a hinge member of the feeder, which allows the faces of the feeder to fold onto each other along respective or closing edges thereof. Before the faces are thus folded, suet and the like may be placed between the two faces. Thereafter, the faces may be folded onto each other so that the suet is compressed between them in a sandwich-like fashion. When the faces are thus folded onto each other, at least one set of hook portions formed by each of the peripheral rods are in alignment with each other. The hook portions allow the feeder to be hanged from a hanging structure. The hanging structure may comprise a tree, a post or other hanging device, for example. In its hanged arrangement, the suet feeder is preferably suspended from the ground to further prevent animals from consuming the suet contained within the feeder.

Although the present invention is primarily designed for feeding birds and the like, it will be appreciated that smaller flying animals such as butterflies and moths may also consume food from the feeder. A light source may also be provided to illuminate the faces of the feeder and to thereby attract species of moths, for example, which may be more active during evening hours.

Referring to FIGS. 1–3, the new and improved suet-press flying animal feeder, generally referred to by reference numeral 10, is shown. Feeder 10 has two faces 12 and 14 of similar geometric shape. As shown in FIG. 1, the two faces 12 and 14 may be folded onto each other so that the feeder 10 is in a closed or feeding orientation. In FIG. 2, on the other hand, the faces 12 and 14 are not folded onto each other, but rather face 14 freely hangs under the influence of gravity. In this arrangement, since the faces are not folded onto each other, feeder 10 is in its open orientation.

With reference to the illustrated raised periphery of the faces, the periphery of face 12, as shown in FIG. 2, is defined by peripheral rod 16 and hinge rod 18 to provide the required raised feature. Sleeves 17a and 17b of face 12 preferably wrap around peripheral rod 16. The periphery of face 14, as also shown in FIG. 2, is formed by peripheral rod 19 and hinge rod 18. Sleeves 19a and 19b of face 14 preferably wrap around peripheral rod 19.

In the particular embodiment shown in FIGS. 1–3, faces 12 and 14 are triangles of similar size and shape. Nevertheless, it will be appreciated by those skilled in the art that faces 12 and 14 could comprise practically any geometric shape imaginable. For instance, referring to FIGS. 5 and 6, it is shown that faces 12 and 14 may comprise a rectilinear geometric shape such as a square, for example. Furthermore, the faces 12 and 14 could comprise other geometric shapes such as a fan-like shape, a shape resembling a circle or a disc, and a stocking-like shape (for the holiday season), for example.

While in its open orientation, as shown in FIG. 2, suet or another compressible available source of food, such as fruit or a fruit nectar soaked sponge or the like, is placed against either face 12, face 14 or both to position it for consumption by a flying animal. Thereafter, faces 12 and 14 are folded onto each other so that the suet or other food source placed between the two faces is compressed in a sandwich-like fashion. When the faces 12 and 14 are thus folded onto each other, a hook portion 20, which may be formed as part of peripheral rod 16, and a hook portion 22, which similarly may be formed as part of peripheral rod 19, are in alignment so that feeder 12 may be hung as shown in FIGS. 1 and 3.

When feeder 10 is in its closed orientation, the respective raised peripheries such as the peripheral rods 16 and 19 engage or are closely spaced from each other along their respective longitudinal lengths. In this closed orientation, it is not possible for animals to gain access to the food from the edges of the device or by forcing a claw or the like into any space left between the respective rods or face edges. Also, with this structure, feeder 10 is slenderly formed so that snow and the like will not gather on it. Typically, the sleeves over the rods engage each other to thwart attempts to open the feeder unless and until the hook portions are separated from the closed position at which they are held as discussed herein.

In one possible circumstance, the raised peripheries may be positioned such that one lies inside the other when the suet feeder is in its closed orientation (see FIG. 7). Under this circumstance, the opposing faces would not be the exact same size. Rather, one of the faces would have a periphery which is slightly smaller than the other face. Thus, in this arrangement, the raised peripheries engage or are closely spaced from each other in an overlapping manner. Referring more specifically to FIG. 7, opposing face 214 has a periphery which is larger than that of face 12 such that the peripheral rod 219 and the sleeves 219a and 219b fit within or overlap the rod 16 and the sleeves 17a and 17b.

Alternatively, the respective raised peripheries (such as the sleeves over the peripheral rods 16 and 19) could simply engage each another along their respective top surfaces, thereby abutting each other in an in-line manner. This particular engagement of peripheral rods 16 and 19 is depicted in FIG. 3. As shown in FIG. 3, the objective of the structural features of feeder 10 is to provide a rigid surface along the edges of the feeder when the feeder is in its closed or feeding orientation. These structural features also ensure that the feeder maintains this closed orientation even when an animal attempts to open the feeder to try to gain access to the food by means other than through the openings in the face(s). As a result of this structure, large non-flying animals such as squirrels, raccoons and the like cannot consume the suet or other source of food contained within feeder 10 when the feeder is in its closed or feeding orientation.

When feeder 10 is in its closed or feeding orientation, birds and other flying animals may consume the suet through apertures or access openings on faces 12 and 14. In the particular embodiment shown in FIGS. 1–3, face 12 includes a series of circular-like apertures 23, those apertures having the same or different sizes. As shown, face 14 comprises a simple "chicken wire" grid structure of the type well known in the art. While these wire structures have the advantage of being inexpensive, they can be less than desirable if they allow too extensive of an access to and exposure of the food source to larger animals for whom the food is not intended.

Thus, as shown in FIGS. 1–3, feeder 10 is designed to permit a flying animal to position a beak or proboscis within one of the apertures so as to gain access to the food which had been pressed thereinto when the feeder had been closed. The flying animal can thus reach and consume the source of food from one or both faces of the feeder. Furthermore, as shown in FIG. 2, feeder 10 is designed so that the source of food is minimally visible when the feeder is in its closed orientation to provide an aesthetically pleasing structure. Nevertheless, it will be appreciated by those skilled in the art that the particular feeding apertures shown on faces 12 and 14 in FIGS. 1–3 are depicted for illustrative purposes only. Therefore, those illustrated arrangements are not meant to constitute a limitation of the claims appended to this specification.

As shown in FIGS. 1–3, feeder 10 is hung by placing hook portions 20 and 22 onto a hanging device 24. Hanging device 24 may include a spring-biased pin 26 so that the device may be opened and closed as desired. Hanging device 24 of FIGS. 1–3 is shown for illustrative purposes only. It will therefore be apparent to those skilled in the art that feeder 10 may be hung from a variety of structures, not merely from the hanging device shown in the figures.

Additionally, a source of light such as light 27 shown in FIG. 1 may be provided to illuminate the faces of the feeder and to thereby attract species of moths, for example, which may be more active during evening hours. It has been found that a thin sponge soaked in fruit nectar or other liquid food source which is compressed between faces 12 and 14 provides an excellent source of food for moths, butterflies and other small flying animals.

Still referring to FIGS. 1–3, there is shown a sleeve 28 of face 14 having tabs 29 and 30 extending therefrom. Tabs 29 and 30 of sleeve 28 wrap around hinge rod 18 to comprise a hinge member 31 of the feeder 10. Hinge member 31 permits face 14 to move from its position in the closed orientation of feeder 10 to its position in the open orientation of the feeder and vice versa.

Similarly, a sleeve 32 having a plurality of tabs 33, 34, 35, 36 extends outwardly from face 12. Tabs 33–36 of sleeve 32 wrap around hinge rod 18 of hinge member 31. Again, hinge member 31 permits face 12 to move from its position in the closed orientation of feeder 10 to its position in the open orientation of the feeder and vice versa. With respect to hinge member 31, hinge rod 18 acts much like a pin does in a typical hinge arrangement. In a preferred manner, hinge member 31 may include a biasing member, such as spring 37 (see FIG. 2), to bias feeder 10 in its open or its closed orientation. The biasing member can be installed to make the feeder either self-closing or self-opening, as desired.

Referring now to FIG. 4, two securing members 38 and 40 are shown. These securing members help secure raised peripheries 274 and 275 of the faces 212 and 214 together when feeder 210 is in its closed orientation. In the embodiment shown in FIG. 4, securing members 38 and 40 comprise generally C-shaped removable clamps that may be made from materials such as resilient metal, plastic and the like. It will be appreciated, however, that securing members 38 and 40 may comprise any structure that will help secure the raised peripheries and thus the faces together. Therefore, the appended claims should not be limited to cover merely the structural embodiments of the C-shaped removable clamps shown in FIG. 4.

The FIG. 4 embodiment includes slots 271 for receiving the illustrated clamps. Rods need not be included in this embodiment. Faces having apertures 272 are hingedly joined by one or more hinges 273. An arrangement such as the clamps 38, 40 or other suitable approach maintain the illustrated closed, food-pressing orientation.

Referring now to FIGS. 5 and 6, in accordance with another preferred embodiment of the invention, feeder 110 is shown having essentially square-like shaped faces 112 and 114. In particular, peripheral rods 116 and 119 are each bent in an a shape different than their shapes shown in FIGS. 1–3. It has been found that the inclusion of two hook portions instead of one on each face for this embodiment has achieved greater stability for the structure of feeder 110 when the feeder is hanged and suspended above the ground. Shown in FIGS. 5 and 6 are a first set of hooks comprising hook portions 42 and 44 and a second set of hooks comprising hook portions 46 and 48. Much like the embodiment shown in FIGS. 1–3, when feeder 110 is in its closed or feeding orientation, hook portions 42 and 44 are in alignment and, likewise, hook portions 46 and 48 are in alignment. Thus, when it is closed, feeder 110 may be hung from structures such as hanging devices 50 and 52, which may be much like the hanging device 24 described above with reference to FIGS. 1–3.

Additionally, face 112 preferably includes a sleeve 54 having a tab 56 extending therefrom. Tab 56 wraps around peripheral rod 116 to further secure face 112 with that rod. Similarly, face 114 preferably includes a sleeve 58 having a plurality of tabs 60, 61, 62 extending therefrom. Tabs 60–62 wrap around peripheral rod 119 to further secure face 114 with that rod.

Outside of these few modifications, the embodiment shown in FIGS. 5 and 6 is otherwise equivalent in structure and function to the embodiment shown in FIGS. 1–3. For instance, suet may be placed against either face 112 or 114 when the feeder 110 is in its open orientation. Thereafter, the feeder 110 may be closed so that faces 112 and 114 fold onto each other. The faces fold at hinge member 131 which may preferably include hinge rod 118. Securing members, such as the C-shaped removable clamps shown in FIG. 4, may be used to secure the peripheral rods 116 and 119 together when those rods engage each other in either an in-line abutting manner or in an overlapping manner. As a result, the suet is positioned between faces 112 and 114 in a sandwich-like fashion. Birds and other flying animals may therefore consume the suet as a source of food. Furthermore, large non-flying animals are prevented from consuming the suet.

Although the present invention has been described with reference to certain preferred embodiments, modifications or changes may be made therein by those skilled in the art without departing from the scope and spirit of the invention as defined by the appended claims.

I claim:

1. A flying animal feeder comprising:

a first face, an inwardly projecting raised periphery of said first face;

a second face, an inwardly projecting raised periphery of said second face;

at least one of said first face or second face having apertures therethrough;

a hinge member hingedly joining said first and second faces;

said feeder having an open orientation wherein an inside surface of at least one of said faces is adapted to have a source of food placed thereon;

said feeder also having a closed orientation at which said faces are positioned so as to be opposed to each other such that said faces are adapted to press the source of food between the faces and into said apertures so as to contain the source of food between the faces; and said first raised periphery and second raised periphery project in generally opposite directions and substantially engage each other when said feeder is in said closed orientation thereby defining a closed edge of said feeder.

2. The flying animal feeder of claim 1 wherein said first raised periphery and said second raised periphery are oriented in an in-line abutting manner when said feeder is in said closed orientation.

3. The flying animal feeder of claim 1 wherein at least one of said faces comprises a grid structure which defines said apertures, which apertures enable a flying animal to feed from the feeder when said feeder is in said closed orientation.

4. The flying animal feeder of claim 1 further comprising a securing member to secure the substantial engagement between the first raised periphery and the second raised periphery when said feeder is in said closed orientation.

5. The flying animal feeder of claim 4 wherein said securing member comprises a hanging member for holding the faces together and which is adapted to suspend the feeder from another structure.

6. The flying animal feeder of claim 4 wherein said securing member comprises a generally C-shaped removable clamp.

7. The flying animal feeder of claim 1 wherein said hinge member includes a biasing member.

8. The flying animal feeder of claim 7 wherein said biasing member comprises a spring.

9. A flying animal feeder comprising:

a first face, an inwardly projecting raised periphery of said first face;

a second face, an inwardly projecting raised periphery of said second face;

at least one of said first face or second face having apertures therethrough;

a hinge member hingedly joining said first and second faces;

said feeder having an open orientation wherein an inside surface of at least one of said faces is adapted to have a source of food placed thereon;

said feeder also having a closed orientation at which said faces are positioned so as to be opposed to each other such that said faces are adapted to press the source of food between the faces and into said apertures so as to contain the source of food between the faces;

said first raised periphery and second raised periphery project in generally opposite directions and substantially engage each other when said feeder is in said closed orientation; and said first raised periphery has a first peripheral rod component which includes a hook portion.

10. The flying animal feeder of claim 4 wherein said second raised periphery has a second peripheral rod component which includes a hook portion.

11. A flying animal feeder comprising:

a first face, an inwardly projecting raised periphery of said first face;

a second face, an inwardly projecting raised periphery of said second face;

at least one of said first face or second face having apertures therethrough;

a hinge member hingedly joining said first and second faces;

said feeder having an open orientation wherein an inside surface of at least one of said faces is adapted to have a source of food placed thereon;

said feeder also having a closed orientation at which said faces are positioned so as to be opposed to each other such that said faces are adapted to press the source of food between the faces and into said apertures so as to contain the source of food between the faces;

said first raised periphery and second raised periphery project in generally opposite directions and substantially engage each other when said feeder is in said closed orientation; and at least one of said raised peripheries has a peripheral rod component including a sleeve generally wrapped over a rod member generally along the periphery of its respective face.

12. A secure flying animal feeder comprising:

a first face having a first inwardly projecting raised periphery;

a second face having a second inwardly projecting raised periphery;

at least one of said first face or second face having apertures therethrough;

said first face having a first hook portion and said second face having a second hook portion;

a hinge member for said first and second faces, said hinge member hingedly joining said first and second faces;

said feeder having an open orientation wherein an inside surface of at least one of said faces is adapted to have a source of food placed thereon;

is said feeder also having a closed orientation at which said faces are positioned so as to be opposed to each other such that said faces are adapted to press the source of food between the faces and into said apertures so as to contain the source of food between the faces;

said first raised periphery and said second raised periphery project in generally opposite respective directions and substantially engage each other in an in-line abutting manner when said feeder is in said closed orientation; and said first hook portion is generally aligned with said second hook portion when said feeder is in said closed orientation.

13. The flying animal feeder of claim 12 further comprising a securing member to secure the substantial engagement between the first raised periphery and the second raised periphery when said feeder is in said closed orientation.

14. The flying animal feeder of claim 13 wherein said securing member comprises a generally C-shaped removable clamp.

15. The flying animal feeder of claim 13 wherein said securing member comprises a securing member adapted to receive said first and second hook portions and maintain same in a closed orientation.

16. The flying animal feeder of claim 15 wherein said securing member includes a suspension component adapted to suspend the feeder from another structure.

17. The flying animal feeder of claim 12 further including a biasing member at said hinge member.

18. A secure flying animal feeder comprising:

a first face having a first inwardly projecting raised periphery;

a second face having a second inwardly projecting raised periphery;

at least one of said first face or second face having apertures therethrough;

said first face having a first hook portion and said second face having a second hook portion;

a hinge member for said first and second faces, said hinge member hingedly joining said first and second faces;

said feeder having an open orientation wherein an inside surface of at least one of said faces is adapted to have a source of food placed thereon;

said feeder also having a closed orientation at which said faces are positioned so as to be opposed to each other such that said faces are adapted to press the source of food between the faces and into said apertures so as to contain the source of food between the faces;

said first raised periphery and said second periphery project in generally opposite respective directions in an overlapping manner when said feeder is in said closed orientation; and said first hook portion is generally aligned with said second hook portion when said feeder is in said closed orientation.

19. The flying animal feeder of claim 18 further comprising a securing member to secure engagement between the first raised periphery and the second raised periphery when said feeder is in said closed orientation.

20. The flying animal feeder of claim 19 wherein said securing member is adapted to receive said first and second hook portions and maintain same in said closed orientation.

21. The flying animal feeder of claim 19 wherein said securing member comprises a generally C-shaped removable clamp.

22. The flying animal feeder of claim 18 wherein said hinge member includes a biasing member.

23. A flying animal feeder comprising:

a first face, an inwardly projecting raised periphery of said first face;

a second face, an inwardly projecting raised periphery of said second face;

at least one of said first face or second face having apertures therethrough;

a hinge member hingedly joining said first and second faces;

said feeder having an open orientation wherein an inside surface of at least one of said faces is adapted to have a source of food placed thereon;

said feeder also having a closed orientation at which said faces are positioned so as to be opposed to each other such that said faces are adapted to press the source of food between the faces and into said apertures so as to contain the source of food between the faces;

said first raised periphery and second raised periphery project in generally opposite directions when said feeder is in said closed orientation; and said first raised periphery and said second raised periphery are oriented in an overlapping manner when said feeder is in said closed orientation.

* * * * *